United States Patent
Nakano et al.

(10) Patent No.: US 8,086,375 B2
(45) Date of Patent: Dec. 27, 2011

(54) METHOD FOR ADJUSTING SENSITIVITY OF LOAD DETECTING DEVICE OF SEAT FOR A VEHICLE

(75) Inventors: Satohiko Nakano, Chiryu (JP); Mutsuro Aoyama, Nagoya (JP); Akira Enomoto, Nagoya (JP); Minoru Izawa, Okazaki (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 985 days.

(21) Appl. No.: 11/930,496

(22) Filed: Oct. 31, 2007

(65) Prior Publication Data

US 2008/0114517 A1   May 15, 2008

(30) Foreign Application Priority Data

Oct. 31, 2006 (JP) ................. 2006-296837
Oct. 19, 2007 (JP) ................. 2007-272346

(51) Int. Cl.
*G05D 3/00* (2006.01)

(52) U.S. Cl. ............. 701/45; 701/1; 701/301; 180/268; 180/272; 180/274; 180/282; 280/735; 280/805; 280/806; 73/723; 73/861.47; 340/576; 242/378.4; 242/384.5

(58) Field of Classification Search ............... 701/1, 45, 701/301; 280/735, 805, 806; 180/268.272, 180/274, 282; 73/723, 861.47; 242/378.4, 242/384.5; 297/216.13, 478; 307/10.1; 340/576
See application file for complete search history.

(56) References Cited

U.S. PATENT DOCUMENTS

| | | | |
|---|---|---|---|
| 4,771,836 A | 9/1988 | Naito et al. | |
| 6,483,602 B1 * | 11/2002 | Haneda | 358/1.16 |
| 6,889,554 B2 | 5/2005 | Hirota | |

(Continued)

FOREIGN PATENT DOCUMENTS

GB   2 342 720 A   4/2000

(Continued)

OTHER PUBLICATIONS

Official Action issued in corresponding JP 2007-272346, Jul. 1, 2008, JPO, JP; and English translation thereof.

(Continued)

*Primary Examiner* — Mary Cheung
*Assistant Examiner* — McDieunel Marc
(74) *Attorney, Agent, or Firm* — Buchanan Ingersoll & Rooney PC

(57) ABSTRACT

A method for adjusting sensitivity of a load detecting device of a seat for a vehicle includes a seat assembling step for assembling the seat with plural load sensors assembled, a zero point adjusting step for obtaining a non-load output value by totaling output values of the load sensors when no load is applied on the seat and memorizing the non-load output value in a memory of a processing device, an adjusted output value calculating step for obtaining an adjusted output value by subtracting the non-load output value from a total of the output values of the load sensors when a predetermined load is applied on the seat, a trimming coefficient calculating step for calculating a trimming coefficient by dividing a designed output value by the adjusted output value, and a trimming coefficient memorizing step for memorizing the trimming coefficient in the memory of the processing device.

9 Claims, 10 Drawing Sheets

U.S. PATENT DOCUMENTS

| | | |
|---|---|---|
| 6,911,635 B2 | 6/2005 | Shon |
| 7,164,117 B2 * | 1/2007 | Breed et al. ............... 250/221 |
| 7,407,029 B2 * | 8/2008 | Breed et al. ............... 180/274 |
| 7,880,594 B2 * | 2/2011 | Breed et al. ............. 340/425.5 |
| 7,889,096 B2 * | 2/2011 | Breed .......................... 340/10.1 |
| 2003/0216886 A1 | 11/2003 | Hattori et al. |
| 2005/0187736 A1 | 8/2005 | Wanami et al. |
| 2007/0057781 A1 * | 3/2007 | Breed ....................... 340/457.1 |
| 2007/0156312 A1 * | 7/2007 | Breed et al. ................. 701/29 |
| 2009/0043441 A1 * | 2/2009 | Breed .......................... 701/29 |
| 2010/0207754 A1 * | 8/2010 | Shostak et al. ............. 340/450 |

FOREIGN PATENT DOCUMENTS

| | | |
|---|---|---|
| JP | 61-104231 A | 5/1986 |
| JP | 6-213734 A | 8/1994 |
| JP | 2000-121463 A | 4/2000 |
| JP | 2002-98580 A | 4/2002 |
| JP | 2002-236069 A | 8/2002 |
| JP | 2002-310826 A | 10/2002 |
| JP | 2003-329508 A | 11/2003 |
| JP | 2004-340561 A | 12/2004 |
| JP | 2005-257668 A | 9/2005 |
| JP | 2006-29944 A | 2/2006 |
| WO | WO 2006/011518 A1 | 2/2006 |
| WO | WO 2006/011597 A1 | 2/2006 |

OTHER PUBLICATIONS

Official Action issued on Jun. 14, 2011 by the Japanese Patent Office in corresponding Japanese Patent Application No. 2008-298484, and English language translation of the Official Action.

* cited by examiner

METHOD FOR ADJUSTING SENSITIVITY OF LOAD DETECTING DEVICE OF SEAT FOR A VEHICLE

CROSS REFERENCE TO RELATED APPLICATIONS

This application is based on and claims priority under 35 U.S.C. §119 to Japanese Patent Application 2006-296837, filed on Oct. 31, 2006 and Japanese Patent Application 2007-272346, filed on Oct. 19, 2007, the entire content of which is incorporated herein by reference.

FIELD OF THE INVENTION

The present invention generally relates to a method for adjusting sensitivity of a load detecting device of a seat for a vehicle, a load detecting device including a plurality of load sensors for measuring a load of an occupant seated on a seat cushion and a processing device for processing an output from each load sensor.

BACKGROUND

Recent requirements have led to detecting a load of an occupant seated on a seat cushion by means of a plurality of load sensors and controlling of operations of an air bag in accordance with a weight of an occupant, which is disclosed in WO2006/011597 (hereinafter, referred to as reference 1), for example. As one of the examples, with reference to FIG. 12, each load sensor disclosed in reference 1 includes a sensor portion 100, an amplifying circuit 101, a digital circuit 102, and a memory 103. The sensor portion 100 is formed by a Wheatstone bridge structured by four strain gauges. A strain generated by the occupant seated on the seat cushion is converted to an electric resistance by strain gauges. The electric resistance is converted to an electric voltage by the Wheatstone bridge. The amplifying circuit 101 amplifies the electric voltage outputted from the sensor portion 100. The digital circuit 102 converts the electric voltage outputted from the amplifying circuit 101 to a digital value and sends the digital value to a processing device. The memory 103 is employed for memorizing a sensitivity AS, which will be described later.

An adjustment of the load detecting sensitivity of the seat for the vehicle is implemented to each load sensor. In the beginning, zero point adjustment is performed when no load is applied to each load sensor. Then, as illustrated in FIG. 12, two sensitivities A1 and A2 are provisionally set, and points P1, P2, P3 and P4 respectively representing sensor output of the load sensor are obtained. Here, each of the points P1 and P3 represents the sensor output when no load is applied to the load sensor, while each of the points P2 and P4 represents the sensor output when a rated load is applied to the load sensor. Afterward, the optimal sensitivity AS is obtained on the basis of a designed value LO under no load being applied to the load sensor and a designed value UP under the rated load being applied to the load sensor. Then, the optimal sensitivity AS is memorized in the memory 103.

According to the seat for the vehicle with the load sensors respectively adjusted as described above, when the occupant is practically seated on the seat for the vehicle, the load of the occupant is precisely detected by correcting and totaling each output of each load sensor by the optimal load sensitivity AS.

However, according to the adjusting method of the load detecting sensitivity of the seat for the vehicle described above, the optimal sensitivity AS is required to be obtained from every load sensor. Further, in order to obtain the optimal sensitivity AS, the sensor output is required to be obtained at both of the provisionally set sensitivities A1 and A2 in accordance with a case where no load is applied to each load sensors and a case where the rated load is applied to each load sensors. Therefore, equipment cost and adjusting cost may be increased. In addition, an examining process is provided as a posterior process of an adjusting process described above. However, the tact time of the adjusting process is longer than that of the examining process. Accordingly, in order to adjust both tact times of the examination process and of the adjusting process, a plurality of adjustment equipments is required relative to one examination equipment, thus leading to an increase of the equipment cost and adjustment cost.

A need thus exists for a method for adjusting the load detecting sensitivity of a seat for a vehicle which is not susceptible to the drawback mentioned above.

SUMMARY OF THE INVENTION

According to an aspect of the present invention, a method for adjusting sensitivity of a load detecting device of a seat for a vehicle includes a sensor assembling step, a seat assembling step, a zero point adjusting step, an adjusted output value calculating step, a trimming coefficient calculating step, and a trimming coefficient memorizing step. The load detecting device includes a plurality of load sensors which output signals respectively so as to measure a load of an occupant seated on a seat cushion and are arranged between a floor-side fixing member adapted to be fixedly mounted on a floor of the vehicle and a seat-side fixing member adapted to be fixed to the seat cushion of the seat. The load detecting device further includes a processing device which is inputted with the signals of the load sensors and processes these signals of the load sensors. In the sensor assembling step, the plurality of load sensors is assembled. In the seat assembling step, the seat for the vehicle is assembled by arranging the plurality of load sensors assembled in the sensor assembling step between the floor-side fixing member and the seat-side fixing member. In the zero point adjusting step, a non-load output value is obtained by totaling values corresponding to the signals of the load sensors when no load is applied on the seat assembled in the seat assembling step. Further in the zero point adjusting step, the non-load output value is memorized in a memory of the processing device. In the adjusted output value calculating step, an adjusted output value is obtained by subtracting the non-load output value from a total output value including a total of the values corresponding to the signals of the load sensors when a predetermined load is applied on the seat for the vehicle. In the trimming coefficient calculating step, a trimming coefficient is calculated by dividing a designed output value corresponding to the predetermined load by the adjusted output value. In the trimming coefficient memorizing step, the trimming coefficient is memorized in the memory of the processing device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
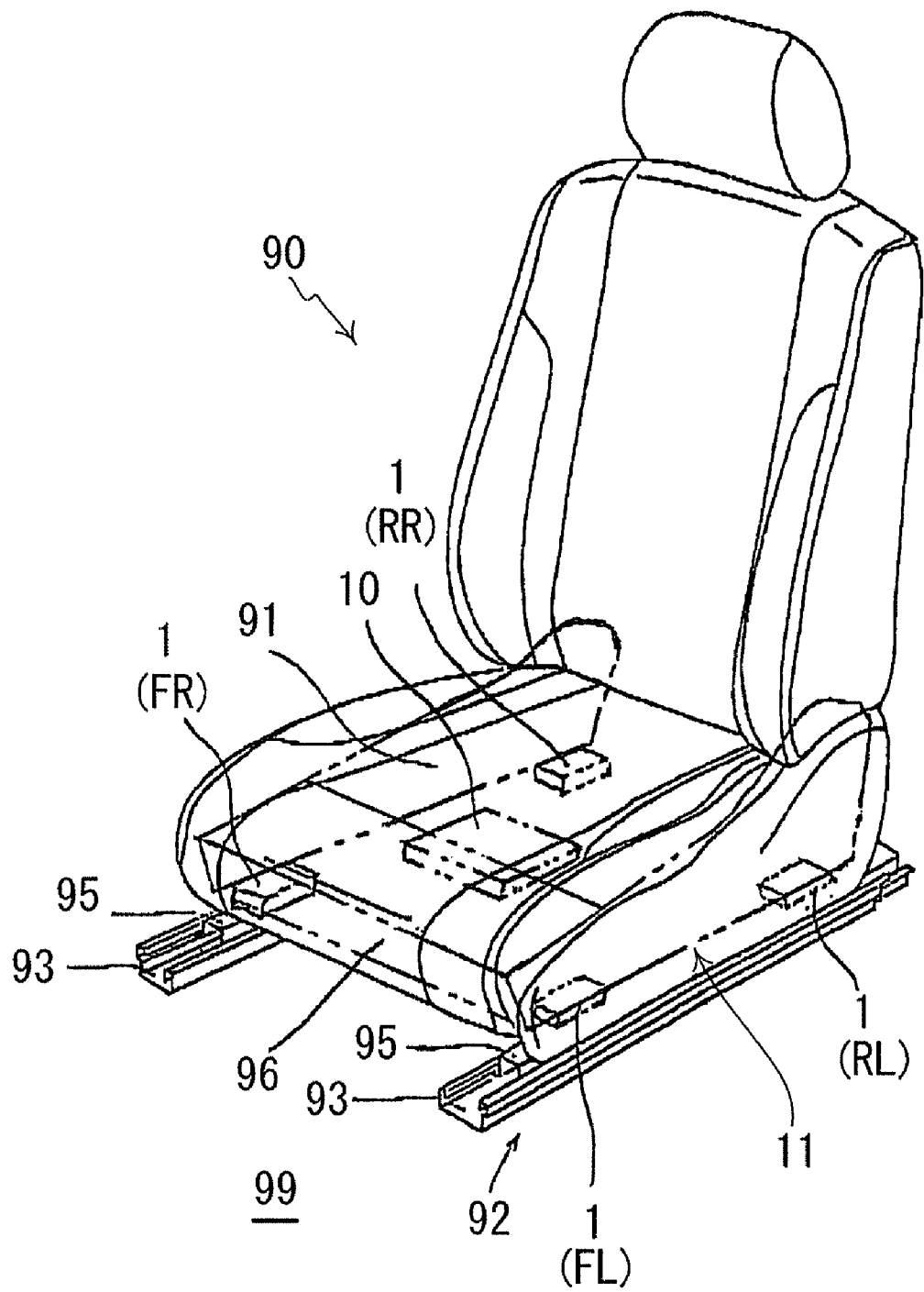
FIG. 1 is a perspective view illustrating a seat for a vehicle according to first to third embodiments of a method for adjusting sensitivity of a load detecting device of the seat for the vehicle.

A first embodiment of a method for adjusting a sensitivity of a load detecting device of a seat for a vehicle (sensitivity adjusting method) according to the present invention will be described hereinafter with reference to attached drawings, and in particular to FIGS. 1 to 3. As best shown in FIG. 1, the load detecting device 11 of the seat for the vehicle adapted with the sensitivity adjusting method according to the first embodiment includes four load sensors 1 (FR, FL, RR, RL) and a sensor ECU 10 (serving as a processing device). The load sensors 1 (FR, FL, RR, RL) outputs signals respectively so as to measure a load of an occupant seated on a seat cushion 91 of the seat 90, and are provided at four corners of a lower portion of a seat cushion 91, respectively. The sensor ECU 10 is inputted with the signals from the load sensors 1 and processes the signals from the load sensors 1. More specifically, as is illustrated in FIG. 1, a seat sliding apparatus 92 is configured to adjustably secure the seat 90 to a vehicle floor 99 in a manner that the seat 90 is positioned in a longitudinal direction of the vehicle. The seat sliding apparatus 92 includes a pair of lower rails 93 and a pair of upper rails 95. The pair of lower rails 93 is fixedly mounted on the vehicle floor 99 and extending in the longitudinal direction of the vehicle. The pair of upper rails 95 is slidably supported by the lower rails 93. In addition, the lower portion of the seat cushion 91 is structured with a frame 96. Among the four corners of the lower surface of the frame 96, two of the four corners arranged in the longitudinal direction are fixed to one of the upper rails 95 (right upper rail 95) via two of the occupant load sensors 1 (FR, RR). The other two of the four corners arranged in the longitudinal direction are fixed to the other one of the upper rails 95 (left upper rail 95) via the other two of the occupant load sensors 1 (FL, RL). Here, the sensor ECU 10 serves as a processing device, and each upper rail 95 serves as a floor-side fixing member and the frame 96 serves as a seat-side fixing member.

Figure 2:
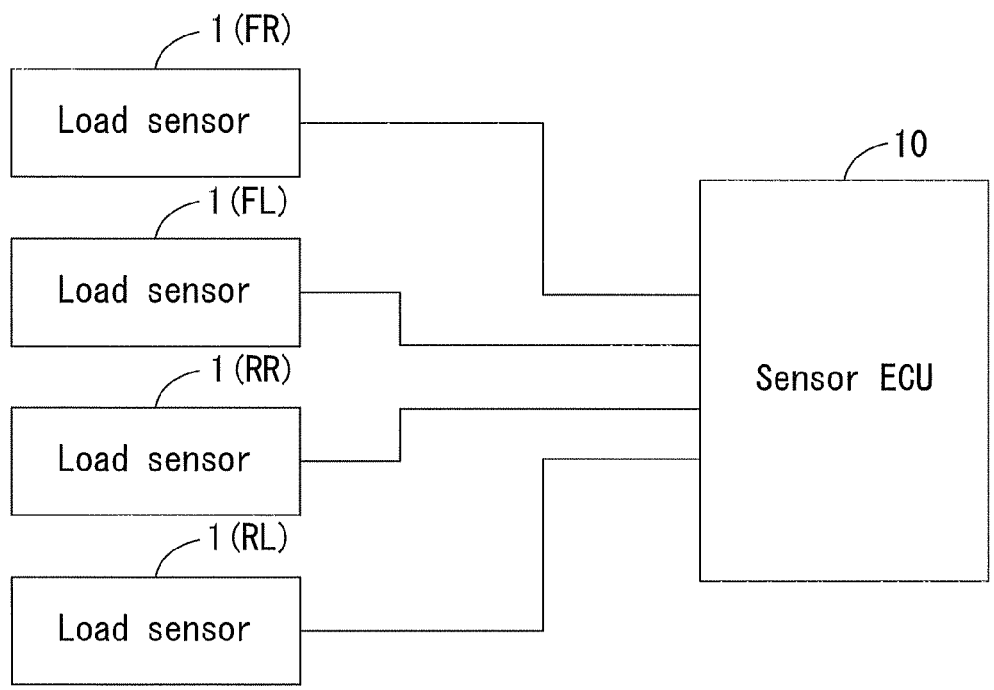
FIG. 2 is a block diagram illustrating an electric connection of the load detecting device of the seat for the vehicle according to the first to third embodiments of the present invention.
Figure 3:
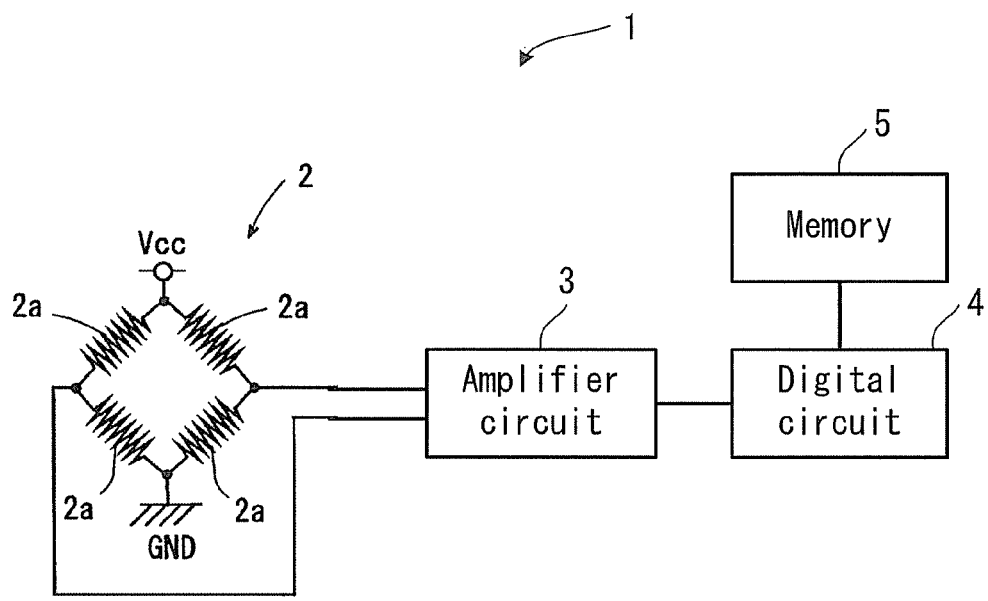
FIG. 3 is a block diagram illustrating an electric connection of each load sensor of the load detecting device according to the method for adjusting the load detecting sensitivity of the seat for the vehicle of first to third embodiments.

FIG. 2 is a block diagram illustrating an electric connection of the seat 90 for the vehicle. According to the load detecting device 11, the four load sensors 1 (FR, FL, RR, RL) and the sensor ECU 10 are electrically connected. FIG. 3 is a block diagram illustrating an electric connection of each load sensor 1. Each load sensor 1 includes a sensor portion 2, an amplifier circuit 3, a digital circuit 4 and a memory 5. The sensor portion 2 is configured with a Wheatstone bridge circuit, which is structured with four strain gauges 2a. A strain, which is generated by a load of an occupant seated on the seat cushion 91, is converted to an electric resistance in the strain gauges 2a, and the electric resistance is converted to an electric voltage by the Wheatstone bridge circuit. The amplifier circuit 3 amplifies the electric voltage outputted from the sensor portion 2. The digital circuit 4 converts the electric voltage outputted from the amplifier circuit 3 to a digital value (serving as the value corresponding to the signal of the load sensor 1) and sends the digital value to the sensor ECU 10. The memory 5 is employed for memorizing a non-load output value $\alpha$ and a trimming coefficient $\beta$, both which will be described later.

Figure 4:
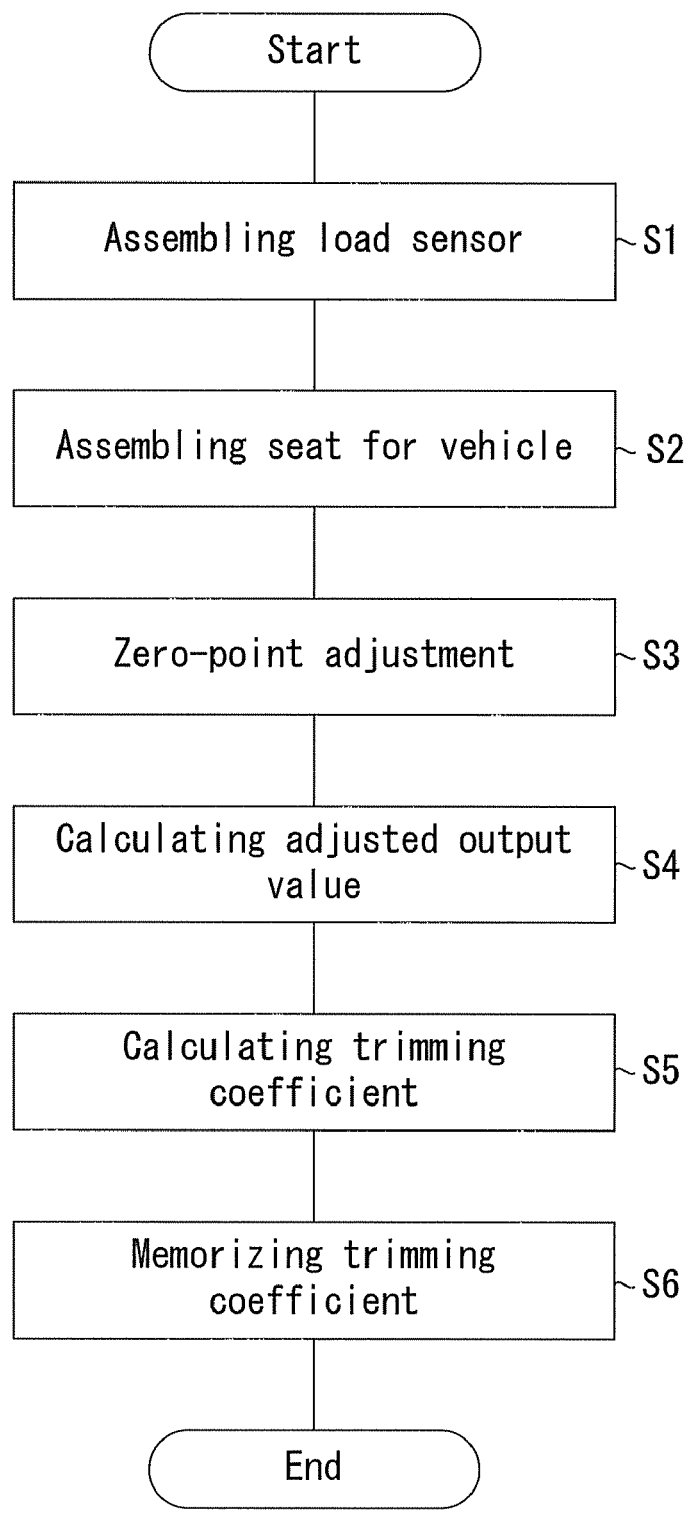
FIG. 4 is a flowchart illustrating a process of the method for adjusting the detecting sensitivity of the seat for the vehicle according to the second embodiment.
Figure 5A:
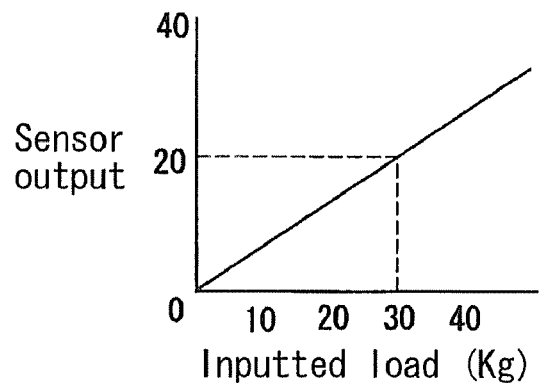
FIGS. 5A to 5D are graphs each illustrating a relationship between an inputted load and a sensor output value of each load sensor according to the first embodiment.
Figure 5B:
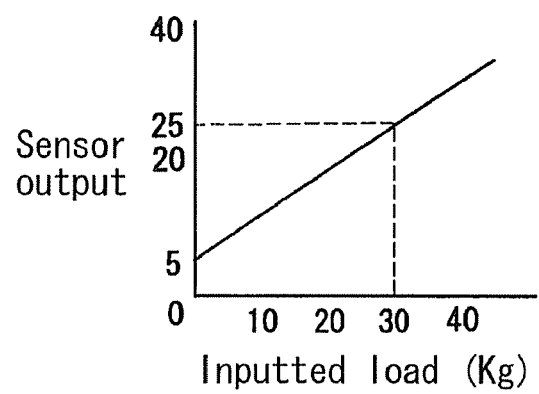
Figure 5C:
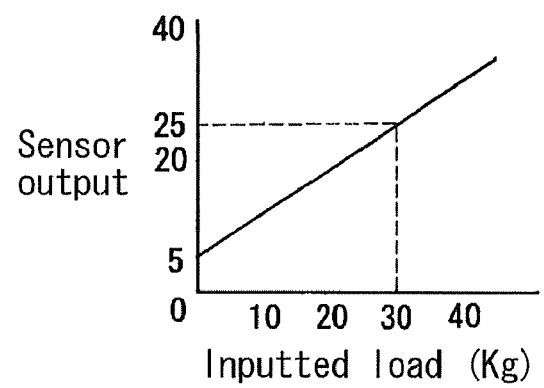
Figure 5D:
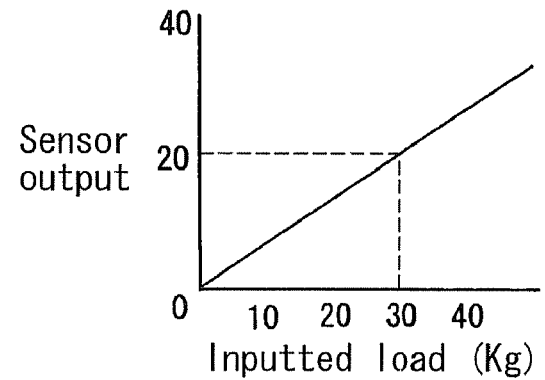

Next, with reference to a flowchart illustrated in FIG. 4, the adjusting method of the sensitivity of the load detecting device 11 of the seat 90 for the vehicle will be described hereinafter. At first, each load sensor 1 is assembled in Step S1. Then, two of the assembled load sensors 1 are arranged between one of the upper rails 95 and the frame 96, and the other two of the assembled load sensors 1 are arranged between the other of the upper rails 95 and the frame 96, thus assembling the seat 90 for the vehicle in Step S2. Step S1 serves as a "sensor assembling step" and Step S2 serves as a "seat assembling step".

In Step S3, for example, the non-load output value $\alpha$ is obtained according to the assembled seat 90 for the vehicle. The non-load output value $\alpha$ is a total of digital values of the load sensors 1 when no load is applied on the seat 90 for the vehicle assembled in Step S2. More specifically, the seat 90 for the vehicle is arranged in a state where no load is applied and then, the non-load output value $\alpha$ inputted to the sensor ECU 10 is memorized in a memory of the sensor ECU 10. Step S3 serves as a "zero-point adjusting step".

In Step S4, a predetermined load is applied on the seat 90 for the vehicle and then, an adjusted output value is obtained by subtracting the non-load output value $\alpha$ from a total output value, which is a total value of sensor output values (output values) of the load sensors 1. Accordingly, the adjusted output value which is implemented the zero point adjustment is obtained. In Step S5, the trimming coefficient $\beta$ is obtained by dividing a designed output value, which corresponds to the predetermined load applied on the seat 90, with the adjusted output value. For example, in a case where the adjusted output value is assigned as 40 when the designed output value which corresponds to 60 Kg of the predetermined load is assigned as 60, the trimming coefficient $\beta$ is obtained as a quotient 1.5, which is obtained by dividing 60 by 40. In Step S6, the trimming coefficient $\beta$ is memorized in the memory of the sensor ECU 10, and then, the sensitivity adjusting method terminates. Step S4 serves as an "adjusted output value calculating step" and Step S5 serves as a "trimming coefficient calculating step". In addition, Step S6 serves as a "trimming coefficient memorizing step".

When the total output value inputted to the sensor ECU 10 from each load sensor 1 is assigned as W, the load of the occupant seated on the seat cushion 91 of the seat 90 is obtained by an equation (1) described hereafter. Additionally, the non-load output value α and the trimming coefficient β are read from the memory of the sensor ECU 10.

$$(W-\alpha) \times \beta \tag{1}$$

Reasons why the load of the occupant seated on the seat cushion 91 can be obtained with the above-described equation (1) will be described hereinafter. At first, a relationship between the inputted load and the sensor output value, of each load sensor 1 is assigned as illustrated in FIG. 5. Each FIG. 5A, 5B, 5C, 5D is a graph illustrating the sensitivity of each load sensor 1 (FR), (FL), (RR), and (RL). Although the zero point of each load sensor 1 is different, a slope of a line in each graph presenting the sensitivity (amplification factor) of each load sensor 1 is in shape.

Figure 6A:
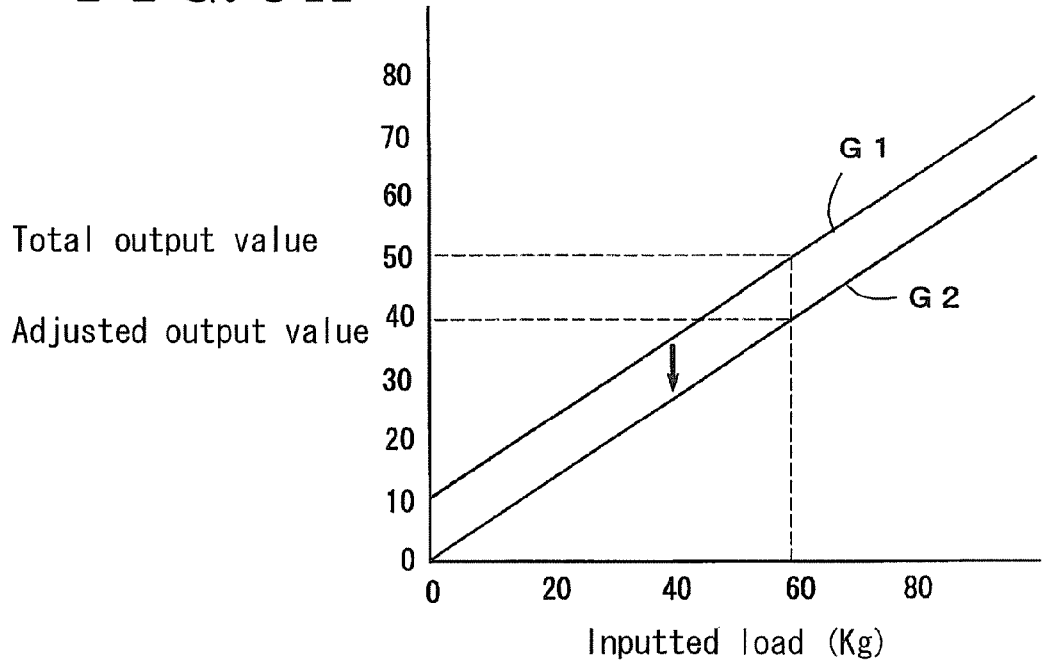
FIGS. 6A and 6B are graphs each illustrating a relationship between the inputted load and a total load value, an adjusted load and a designed load.

The total output value W inputted to the sensor ECU 10 from each load sensor 1 is represented by a graph G1 illustrated in FIG. 6A. In graph G1, the non-load output value α is 10. When the zero point adjustment is implemented according to the graph G1, a graph G2 showing the adjustment output value is obtained. The adjustment output value after implementing the zero point adjustment is represented as (W−α). For example, when the amount of the inputted load is 60 Kg, the total output value W (see graph G1) is 50 and after implementing the zero point adjustment, the adjusted output value (Graph G2) is obtained as 40.

Figure 6B:
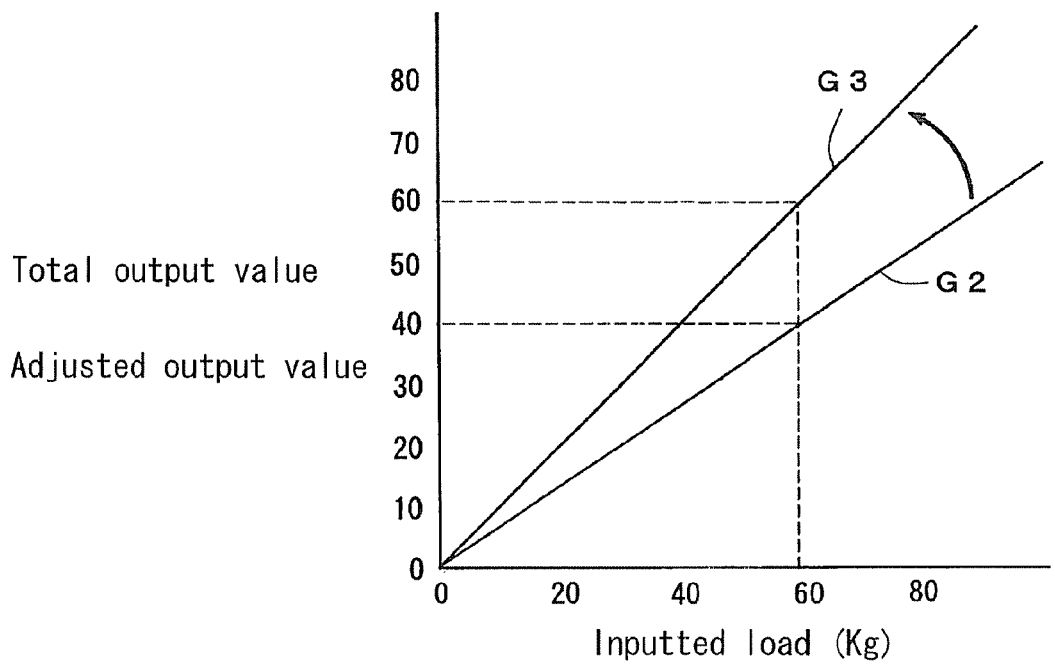

Then, as illustrated in FIG. 6B, a graph G3 showing the designed output value is obtained by multiplying the adjustment output value (see graph G2) by the trimming coefficient β (=1.5). The designed output value after trimming is represented as (W−α)×β. For example, in a case where the inputted load is assigned as 60 Kg, the adjusted output value (graph G2) after the zero point adjustment is assigned as 40. Accordingly, the designed output value after trimming is obtained as 60 by multiplying 40 by 1.5 (40×1.5=60). Therefore, the inputted load is obtained precisely from the total output value W, of the sensor output values of the load sensors 1, inputted to the sensor ECU 10.

According to the load detecting sensitivity 11 of the seat 90 for the vehicle adjusted by means of the sensitivity adjusting method of the first embodiment, when the occupant is practically seated on the seat 90 for the vehicle, the adjusted output value is obtained by subtracting the non-load output value α from the total sensor output value W of the sensor output values of the load sensors 1. Then, the load of the occupant is precisely obtained by multiplying the adjusted output value by the trimming coefficient β. Further, according to the sensitivity adjusting method, the seat 90 for the vehicle is assembled after arranging each load sensor 1 between the upper rail 95 and the frame 96. Then the non-load output value α and the trimming coefficient β are obtained. Accordingly, there is no need to adjust every load sensor 1. In addition, according to the sensitivity adjusting method of the first embodiment, the seat 90 for the vehicle is applied with the predetermined load only one time, and then the adjusted output value is obtained considering the non-load output value α. Further, the designed output value corresponding to the predetermined load is divided by the adjusted output value. As described above, the trimming coefficient β is obtained readily. Accordingly, it is possible to reduce a tact time of an adjusting process, which includes the steps from Step 1 to Step 6 described above. Therefore, according to the method for adjusting the sensitivity of the load detecting device of the seat for the vehicle, the load of the occupant is precisely detected and further, manufacturing cost may be reduced.

Figure 7:
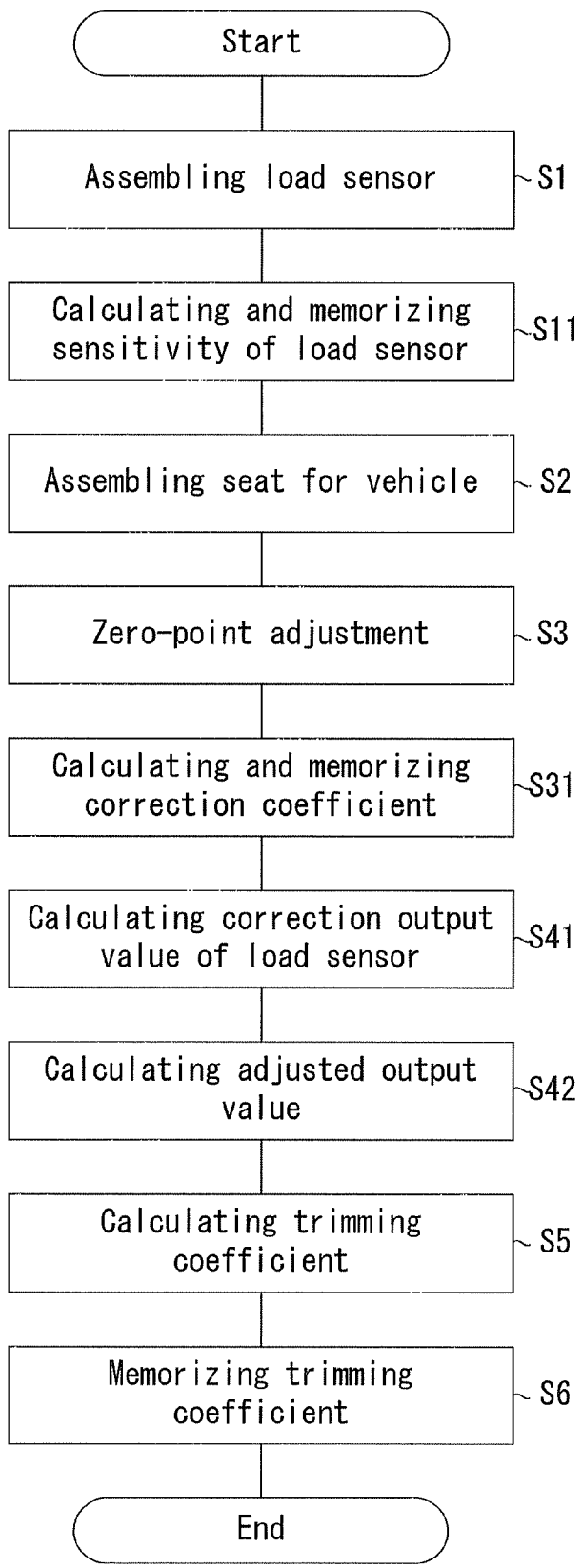
FIG. 7 is a flowchart illustrating a process of the method for adjusting the detecting sensitivity of the seat for the vehicle according to the second embodiment.
Figure 8A:
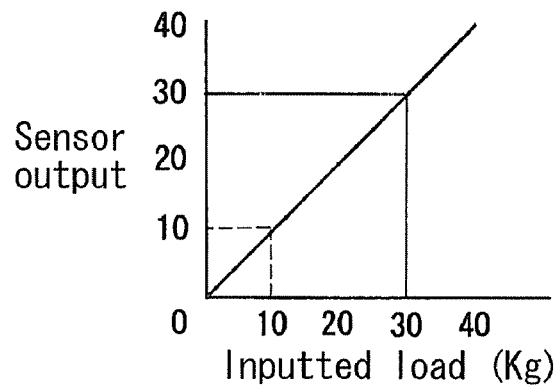
FIGS. 8A to 8D are graphs each illustrating a relationship between the inputted load and the sensor output value of each load sensor according to the second embodiment.
Figure 8B:
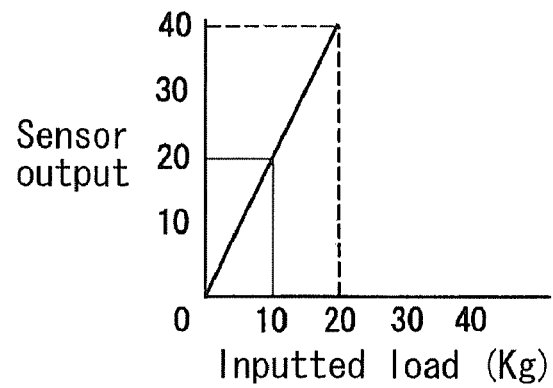
Figure 8C:
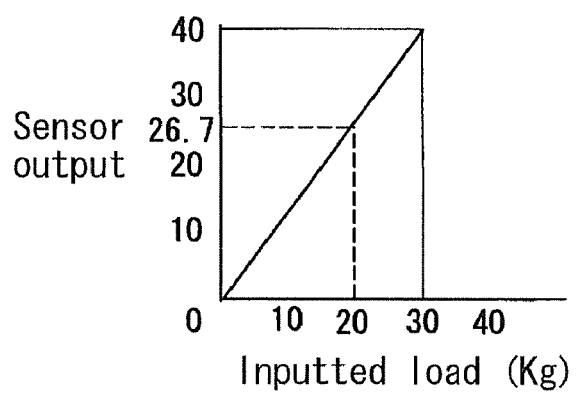
Figure 8D:
Figure 9A:
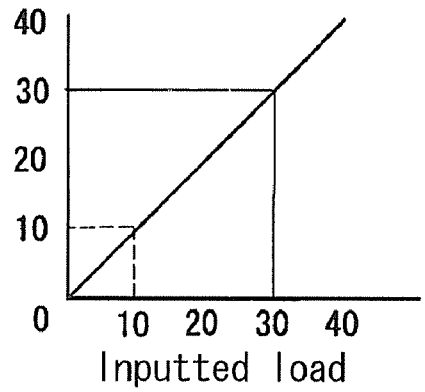
FIGS. 9A to 9D are graphs each illustrating a relationship between each inputted load and each correction output value of each load sensor according to the second embodiment.
Figure 9B:
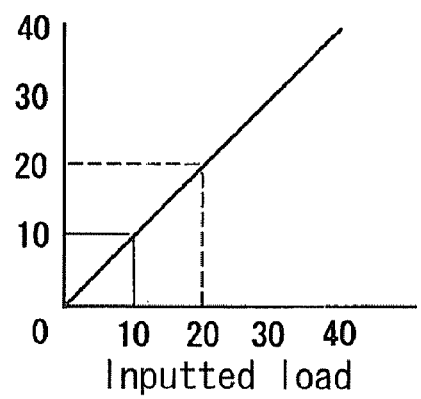
Figure 9C:
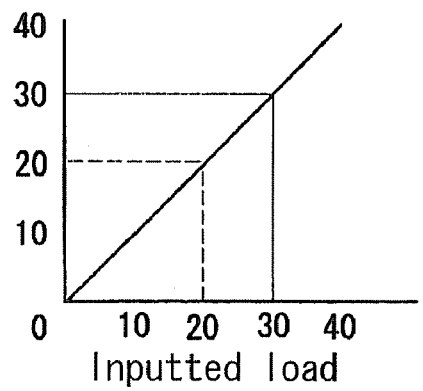
Figure 9D:
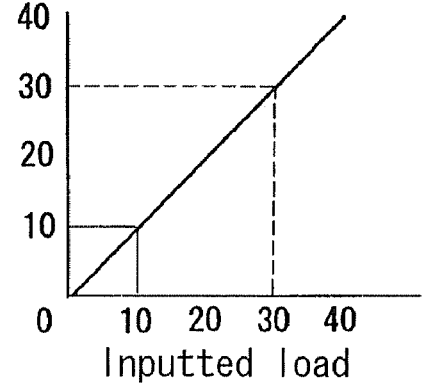
Figure 10:
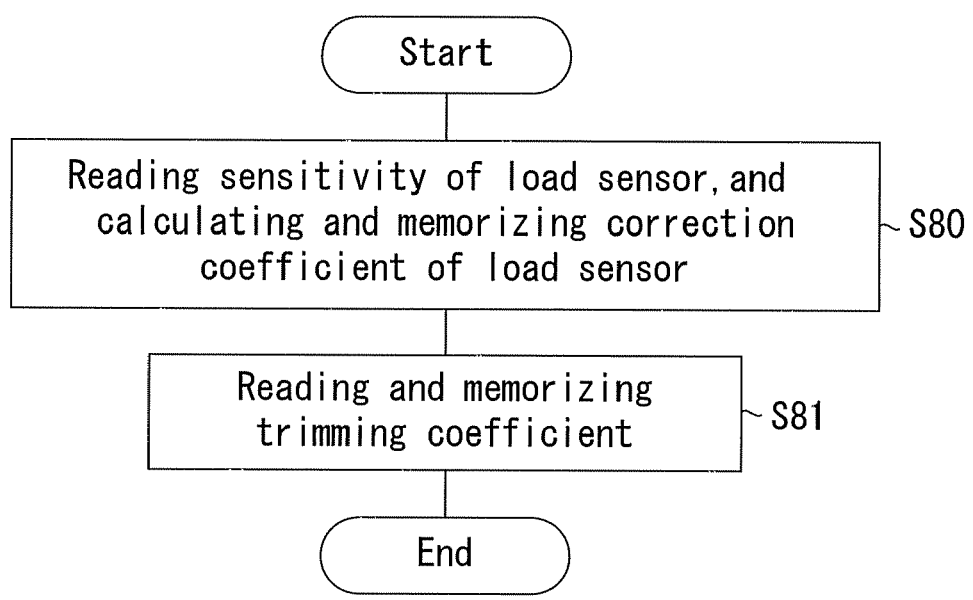
FIG. 10 is a flowchart illustrating a process when exchanging a sensor ECU according to the method for adjusting the load detecting sensitivity of the seat for the vehicle of the third embodiment.

A second embodiment of a method for adjusting the load detecting sensitivity of a seat for a vehicle will be described hereinafter. In the second embodiment, the seat 90 for the vehicle and the load sensors 1, which are illustrated in FIGS. 1 to 3, are used in the same manner as the first embodiment. In addition, according to the second embodiment, the sensitivity of the load detecting sensitivity 1 is adjusted on the basis of the process of a flowchart illustrated in FIG. 7. The steps being identical with those shown in the flowchart of the sensitivity adjustment method according to the first embodiment (see FIG. 4) will be denoted with the same codes, respectively, and the description of these steps will be omitted herein.

In Step S11, sensitivity of each load sensor 1 is obtained after assembling each load sensor 1 and is memorized in a memory in each load sensor 1. The sensor sensitivity is obtained by subtracting the sensor output value of the load sensor 1 under no load being applied thereto from the sensor output value of the load sensor 1 under the predetermined load being applied thereto. Step S11 is a part of the "sensor assembling step" (Step S1) and serves as "a load sensor sensitivity processing step".

In Step S31, each correction coefficient is obtained by dividing a set sensor sensitivity of each load sensor 1 by the obtained sensitivity of each load sensor and then each correction coefficient is memorized in the memory of the sensor ECU 10, before or after implementing the zero-point adjustment according to the seat 90 for the vehicle. Step S31 is a part of the "zero-point adjusting step" (Step S3) and serves as "a correction coefficient processing step".

In Step S41, the predetermined load is applied on the seat 90 for the vehicle, and a correction output value of each load sensor 1 is obtained by multiplying the sensor output value of each load sensor 1 by the correction coefficient of each load sensor 1. Each correction coefficient herein is the correction coefficient memorized in the memory of the sensor ECU 10 in Step S31. In Step S42, the adjusted output value is obtained on the basis of the correction output value of each load sensor 1. The adjusted output value herein is implemented with the zero point adjustment. In other words, the adjusted output value is obtained by subtracting the non-load output value α from a total value of the correction output value of each load sensor 1. Each of the Step S41 and the Step S42 is a part of the "adjusted output value calculating step" (Step 4) and both serve as "a correction output value calculating step".

According to the load detecting device 11 of the seat 90 for the vehicle adjusted by the sensitivity adjusting method of the second embodiment, the load of the occupant seated on the seat cushion 91 is obtained as follows. At first, the sensor output value of each load sensor 1 is inputted to the sensor ECU 10. Then, each correction coefficient is multiplied to the sensor output value of the corresponding load sensor 1, and the total output value W is obtained by summing all of the sensor output value of each load sensor 1 multiplied by the correction coefficient. Afterward, the load of the occupant seated on the seat 90 for the vehicle is obtained by the above-described equation (1), in the same manner as the first embodiment.

The sensitivity adjusting method of the second embodiment is applied in a case where the sensitivity (amplification factor) of each load sensor 1 is not identical, which is different from the first embodiment. Reasons why the load of the occupant seated on the seat cushion 91 can be obtained with the sensitivity adjusting method of the second embodiment will be described hereinafter, in comparison with a case where sensitivity correction of the output value of each load sensor 1 is not implemented.

A relationship between the inputted load of each load sensor 1 and the sensor output value of each load sensor 1, before implementing the sensitivity correction, is assigned as illustrated in FIG. 8. Each FIG. 8A, 8B, 8C, 8D is a graph illustrating the sensitivity of each load sensor 1(FR), 1(FL), 1(RR), and 1(RL). In order to facilitate the description herein, each zero point of each load sensor 1 is set to be identical. Further, each non-load output value $\alpha$ is assigned as zero ($\alpha=0$) and each trimming coefficient $\beta$ is assigned as 1 ($\beta=1$).

At first, a case, where the sensitivity correction of the output value of each load sensor 1 is not implemented, will be described hereinafter. The load of the occupant seated on the seat cushion 91 is assigned as 80 Kg. At the beginning, for example as illustrated in FIGS. 8A to 8D and as represented by continuous lines therein, when the load sensors 1(FR), 1(FL), 1(RR), and 1(RL) are applied with 30 Kg, 10 Kg, 30 Kg, and 10 Kg, from among the 80 Kg of the load of the occupant, respectively, the total output value becomes about 93.3. Next, as illustrated with the dotted lines in FIG. 8, in a case where the load sensor 1(FR), 1(FL), 1(RR), and 1(RL) are applied with 10 Kg, 20 Kg, 20 Kg, and 30 Kg, from among the 80 Kg of the load of the occupant, respectively, the total output becomes 86.7. Consequently, in a case where the sensitivity correction is not performed, even when an equal load of the identical occupant is applied, a different load is detected in accordance with a sitting manner on the seat cushion 91.

FIG. 9 is a graph illustrating a relationship between the inputted load of each load sensor 1 and the sensor output value of each load sensor 1, after implementing the sensitivity correction. Each FIG. 9A, 9B, 9C, 9D is a graph illustrating the sensitivity of each load sensor 1(FR), 1(FL), 1(RR), and 1(RL). These graphs are obtained by multiplying each correction coefficient by the sensor output value of each load sensor 1. At the beginning, as illustrated with continuous lines in FIG. 9, in a case where the load sensors 1(FR), 1(FL), 1(RR), and 1(RL) are applied with 10 Kg, 20 Kg, 20 Kg, and 30 Kg, from among the 80 Kg of the load of the occupant, respectively, the total output value becomes 80. Next, as illustrated with dotted lines in FIG. 9, in a case where the load sensors 1(FR), 1(FL), 1(RR), and 1(RL) are applied with 10 Kg, 20 Kg, 20 Kg, and 30 Kg, from among the 80 Kg of the load of the occupant, respectively, the total output value becomes 80. Consequently, in the case where the sensitivity correction is implemented, the load of the occupant is precisely detected regardless of the sitting manner on the seat cushion 91. Here, the trimming coefficient $\beta$ is assigned as 1, hence the total output value corresponds to the designed output value. In addition, in a case where the non-load output value $\alpha$ is not equal to zero, or in a case where the trimming coefficient is not assigned as 1, the load of the occupant will be precisely detected as described in the first embodiment.

According to the load detecting device 1 of the seat 90 for the vehicle implemented with the sensitivity adjusting method of the second embodiment, the correction coefficient of each load sensor 1 is obtained by dividing the set sensor sensitivity with the sensor sensitivity of each load sensor 1 and is memorized in the memory of the sensor ECU 10 in Step S31. Then, the correction output value of each load sensor 1 is obtained by multiplying the digital value of each load sensor 1 by the correction coefficient of each load sensor 1, and the adjusted output value is obtained by totaling the correction output value of each load sensor 1 in Steps S41 and S42, hence the sensitivity of each load sensor 1 is arranged to be identical. Therefore, according to the above described sensitivity adjusting method, even when each load sensor 1 is applied with an unequal load, the load of the occupant is precisely detected. Other influences, effects, or the like, are same as in the first embodiment.

A third embodiment of the method for adjusting the sensitivity of the load detecting device 11 of the seat 90 for the vehicle will be described herein referring to the same seat 90 for the vehicle and the same load sensors 1 illustrated in FIGS. 1 to 3, which are used in the first embodiment. In addition, according to the sensitivity adjusting method of the third embodiment, the sensitivity of the load detecting device 11 is adjusted on the basis of a flowchart illustrated in FIG. 7, which is referred to in the second embodiment. Further, the correction coefficient of each load sensor 1 is memorized in the memory of the sensor ECU 10 in Step S31. Still further, the trimming coefficient $\beta$ is memorized not only in the memory of the sensor ECU 10, but also in the memory 5 of each load sensor 1. However, the trimming coefficient $\beta$ is not necessarily memorized in every memory 5 of the load sensors 1. Alternatively, the trimming coefficient $\beta$ may be memorized in at least one memory 5, from among four memories 5 of the four load sensors 1 (FR, RR, FL, RL). Further, Step S31 may be a previous step of Step S3.

Figure 11:
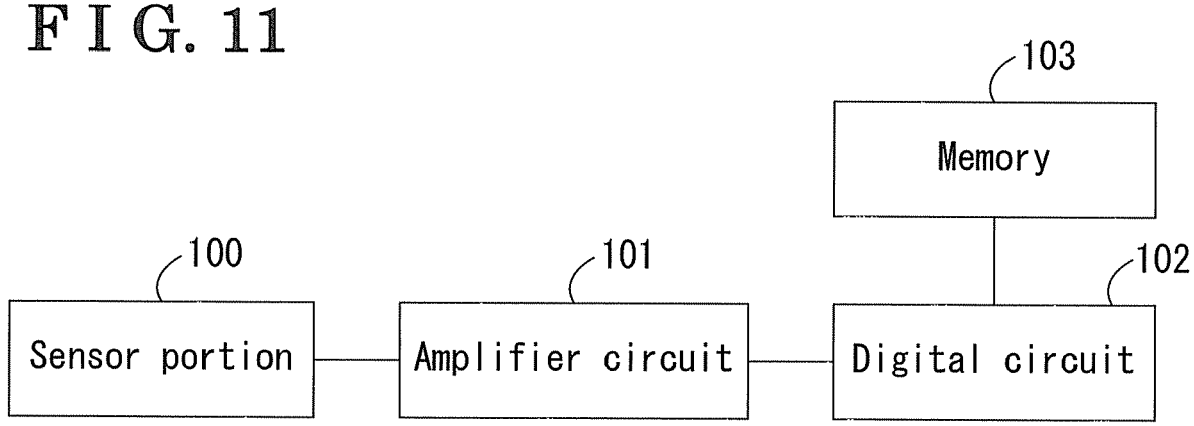
FIG. 11 is a block diagram illustrating the electric connection of the load sensor according to a known method for adjusting the load detecting sensitivity of the seat for the vehicle.
Figure 12:
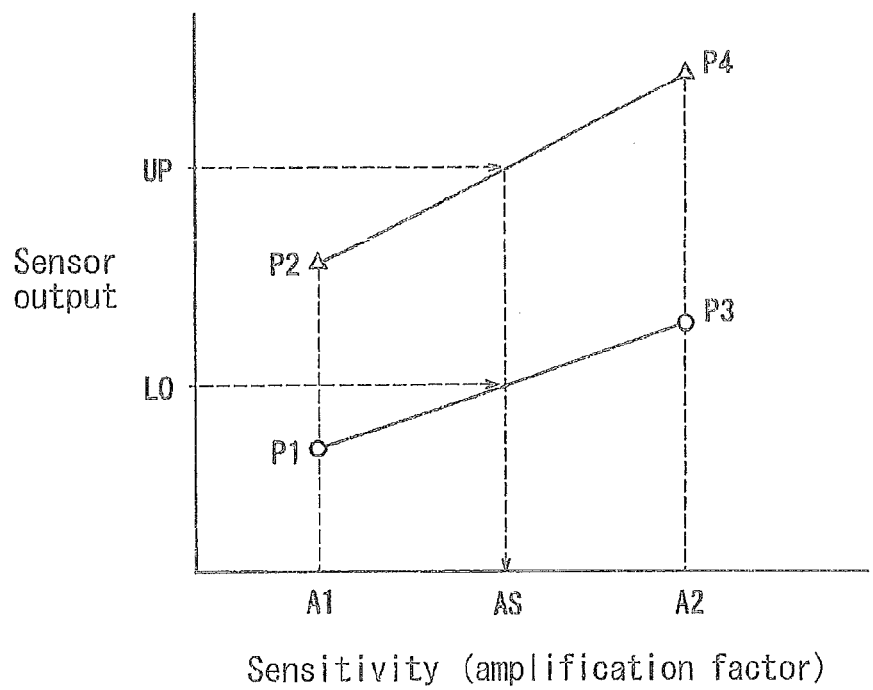
FIG. 12 is a graph illustrating a sensitivity adjusting method according to the known method for adjusting the load detecting sensitivity of the seat for the vehicle.

According to load detecting device 11 of the seat 90 for the vehicle adjusted on the basis of the sensitivity adjusting method of the third embodiment, the load of the occupant seated on the seat cushion 91 is same as in the second embodiment. Further, according to the sensitivity adjusting method of the third embodiment, when the sensor ECU 10 is exchanged, a process illustrated in the flowchart of FIG. 11 is performed. In other words, the sensor sensitivity is read from the memory 5 of each load sensor 1 and the correction coefficient of each load sensor 1 is calculated. Then, the correction coefficient of each load sensor 1 is memorized in the memory of a new (exchanged) sensor ECU 10 in Step S80 (serving as "a correction coefficient memorizing step"). In addition, the trimming coefficient $\beta$ is read from any of memories 5 of the load sensors 1 and is memorized in the memory of the new sensor ECU 10 in Step S81 (serving as "a trimming coefficient processing step").

According to the load detecting device 11 of the seat 90 for the vehicle adjusted on the basis of the sensitivity adjusting method of the third embodiment, in a case where the sensor ECU 10 is required to be exchanged because of a trouble, for example, each correction coefficient calculated on the basis of the sensor sensitivity read from the memory 5 of each load sensor 1 and the trimming coefficient $\beta$ read from at least one memory 5 of the load sensor 1 can be inherited. Other influences and effects are same as in the first embodiment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for adjusting sensitivity of a load detecting device of a seat for a vehicle, the load detecting device including a plurality of load sensors outputting signals respectively so as to measure a load of an occupant seated on a seat cushion and arranged between a floor-side fixing member configured to be fixedly mounted on a floor of the vehicle and a seat-side fixing member configured to be fixed to the seat cushion of the seat, and a processing device inputted with the signals and processing a total output signal obtained by a sum of the signals from the plurality of load sensors, the method comprising:

a sensor assembling step for assembling the plurality of load sensors;

a seat assembling step for assembling the seat for the vehicle by arranging the plurality of load sensors assembled in the sensor assembling step between the floor-side fixing member and the seat-side fixing member;

the processing device performing:

a zero point adjusting step for obtaining a total non-load output value by totaling values corresponding to the signals of the load sensors when no load is applied on the seat cushion for the vehicle assembled in the seat assembling step and for memorizing the total non-load output value in a memory of the processing device;

an adjusted output value calculating step for obtaining an adjusted output value by subtracting the total non-load output value from a total load-applied output value including a total of the values corresponding to the signals of the load sensors in a state where a predetermined load is applied to the load sensors when the predetermined load is applied on the seat cushion for the vehicle;

a trimming coefficient calculating step for calculating a trimming coefficient by dividing a designed output value corresponding to the predetermined load by the adjusted output value;

a trimming coefficient memorizing step for memorizing the trimming coefficient in the memory of the processing device; and a step for calculating the load of the occupant by multiplying the adjusted output value by the trimming coefficient.

2. A method for adjusting sensitivity of a load detecting device of a seat for a vehicle according to claim 1, further comprising:

a load sensor sensitivity processing step for obtaining sensitivity of each load sensor by subtracting an output value of each load sensor under no load being applied from an output value of each load sensor under a predetermined load being applied, and then memorizing the obtained sensitivity of each load sensor in a memory of each load sensor after the sensor assembly step;

a correction coefficient processing step for obtaining a correction coefficient of each load sensor by dividing a set sensor sensitivity by the obtained sensitivity of each load sensor, and then memorizing the correction coefficient obtained of each load sensor in the memory of the processing device before adjusting a zero point of the seat for the vehicle in the zero point adjusting step; and a correction output value calculating step for obtaining a correction output value of each load sensor by multiplying the output value of each load sensor by the correction coefficient of each load sensor, and then obtaining the adjusted output value by subtracting the non-load output value from a total value of the correction output value of each load sensor in the adjusted output value calculating step.

3. A method for adjusting sensitivity of a load detecting device of a seat for a vehicle according to claim 2 wherein the trimming coefficient is memorized in at least one of the memory of the load sensors, and wherein the trimming coefficient memorizing step further comprising:

a correction coefficient memorizing step for memorizing each correction coefficient calculated based on the sensitivity of each load sensor, the sensitivity read from the memory of each load sensor; and a trimming coefficient processing step for reading the trimming coefficient from the at least one of the memories of the load sensors and memorizing the trimming coefficient to another processing device.

4. A method for adjusting sensitivity of a load detecting device of a seat for a vehicle according to claim 1, further comprising:

a load sensor sensitivity processing step for obtaining sensitivity of each load sensor by subtracting an output value of each load sensor under no load being applied from an output value of each load sensor under a predetermined load being applied, and then memorizing the obtained sensitivity of each load sensor in a memory of each load sensor after the sensor assembly step;

a correction coefficient processing step for obtaining a correction coefficient of each load sensor by dividing a set sensor sensitivity by the obtained sensitivity of each load sensor, and then memorizing the correction coefficient obtained of each load sensor in the memory of the processing device after adjusting a zero point of the seat for the vehicle in the zero point adjusting step; and a correction output value calculating step for obtaining a correction output value of each load sensor by multiplying the output value of each load sensor by the correction coefficient of each load sensor, and then obtaining the adjusted output value by subtracting the non-load output value from a total value of the correction output value of each load sensor in the adjusted output value calculating step.

5. A method for adjusting sensitivity of a load detecting device of a seat for a vehicle according to claim 4 wherein the trimming coefficient is memorized in at least one of the memory of the load sensors, and wherein the trimming coefficient memorizing step further comprising:

a correction coefficient memorizing step for memorizing each correction coefficient calculated based on the sensitivity of each load sensor, the sensitivity read from the memory of each load sensor; and a trimming coefficient processing step for reading the trimming coefficient from the at least one of the memories of the load sensors and memorizing the trimming coefficient to another processing device.

6. A method for adjusting sensitivity of a load detecting device of a vehicle seat of a vehicle, the load detecting device including a plurality of load sensors outputting respective signals to measure a load of an occupant seated on a seat cushion of the vehicle seat and arranged between a floor-side fixing member fixedly mountable on a floor of the vehicle and a seat-side fixing member fixable to the seat cushion of the vehicle seat, the method comprising:

obtaining a total non-load output value by totaling values corresponding to the signals of the plurality of load sensors when no load is applied on the seat cushion;

applying a predetermined load to the seat cushion;

obtaining a total load-applied output value by totaling values corresponding to the signals of the plurality of load sensors while the predetermined load is applied on the seat cushion;

obtaining an adjusted output value by subtracting the total non-load output value from the total load-applied output value;

calculating a trimming coefficient by dividing a designed output value corresponding to the predetermined load by the adjusted output value; and memorizing the trimming coefficient in memory to be used to calculate the load of the occupant of the vehicle seat.

7. A method for adjusting sensitivity of a load detecting device of a seat for a vehicle according to claim 6, further comprising:

obtaining sensitivity of each of the load sensors by subtracting an output value of each load sensor under no load from an output value of each load sensor under a predetermined load;

obtaining a correction coefficient of each load sensor by dividing a set sensor sensitivity by the obtained sensitivity of each load sensor; and obtaining a correction output value of each of the load sensors by multiplying the output value of each load sensor by the correction coefficient of each load sensor, and then obtaining the adjusted output value by subtracting the non-load output value from a total value of the correction output value of each load sensor.

8. A method for adjusting sensitivity of a load detecting device of a seat for a vehicle according to claim 7, wherein the trimming coefficient is memorized in at least one of the memory of the load sensors, and further comprising memorizing each correction coefficient calculated based on the sensitivity of each load sensor, and reading the trimming coefficient from the at least one of the memories of the load sensors and memorizing the trimming coefficient to a processing device.

9. A method for adjusting sensitivity of a load detecting device of a seat for a vehicle according to claim 6, further comprising:

obtaining sensitivity of each of the load sensors by subtracting an output value of each load sensor under no load from an output value of each load sensor under a predetermined load;

obtaining a correction coefficient of each of the load sensors by dividing a set sensor sensitivity by the obtained sensitivity of each load sensor, and then memorizing the correction coefficient obtained for each load sensor after adjusting a zero point of the seat for the vehicle; and obtaining a correction output value of each load sensor by multiplying the output value of each respective load sensor by the correction coefficient of the respective load sensor, and then obtaining the adjusted output value by subtracting the non-load output value from a total value of the correction output value of each load sensor.

* * * * *